United States Patent Office 2,838,486
Patented June 10, 1958

2,838,486

AZO PIGMENTS CONTAINING OXDIAZOLE RINGS

Willy Mueller, Riehen, and Adolf Emil Siegrist, Basel, Switzerland, assignors to Ciba Limited, Basel, Switzerland, a Swiss firm No Drawing. Application July 6, 1955
Serial No. 520,368

Claims priority, application Switzerland July 7, 1954

7 Claims. (Cl. 260—157)

This invention provides new oxdiazoles which, like, for example, the compound of the formula (1)
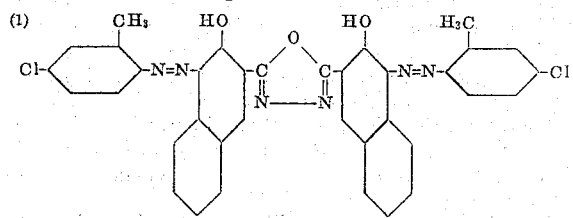

contain at least one oxdiazole ring and bound directly to that ring at least one aromatic nucleus which is bound to an azo linkage.

The invention also provides a process for making the aforesaid new oxdiazoles, wherein an N(1):N(2)-di-acylhydrazine, in which both of the acyl groups bound to the hydrazine radical are derived from carboxylic acid groups and at least one of the —CO— groups is bound to an aryl-carbon atom of a radical which contains an azo linkage, is treated with an agent bringing about ring closure.

The N(1):N(2)-diacyl-hydrazines can be made by acylating hydrazines, and, for example, hydrazine may be acylated at both nitrogen atoms with the same radical of the constitution given above or two different acyl radicals may be introduced in stages at least one of which radicals is of the aforesaid constitution. As acylating agents there are advantageously used functional derivatives, for example, methyl esters or halides, for example, bromides or especially chlorides of the carboxylic acids used. There may be mentioned, for example, the following possibilities:

(a) Hydrazine is acylated at both nitrogen atoms with the derivative of a carboxylic acid containing an azo linkage, and of which the carboxylic acid group is bound to an aromatic nucleus.

(b) Hydrazine is acylated at both nitrogen atoms with a derivative of a carboxylic acid capable of coupling, and of which the carboxylic acid group is bound to an aromatic nucleus, and the resulting carboxylic acid hydrazide is coupled with a diazo compound.

(c) Hydrazine is acylated in either order of succession with two different carboxylic acid derivatives of the kind mentioned under (a).

(d) Hydrazine is acylated in either order of succession with two different carboxylic acid derivatives of the constitution mentioned under (b) and the resulting carboxylic acid hydrazide is coupled with a diazo compound.

(e) Hydrazine is acylated in either order of succession with two different acid derivatives, of which one has the constitution mentioned under (a) or (b) above and the other has neither the constitution according to (a) nor that according to (b). One of the acid derivatives, for example, that which is last mentioned may be a derivative of a dicarboxylic acid, for example, maleic anhydride, so that a diacyl-hydrazine is obtained containing a free carboxylic acid group. By using a suitable agent capable of bringing about ring closure, such, for example, as thionyl chloride, the carboxylic acid group is converted into a carboxylic acid halide group simultaneously with the ring closure. An oxdiazole so obtained which contains a carboxylic acid halide group may then be condensed with an arylamine, a diamine or hydrazine or a hydrazide, whereby in the latter cases further ring closure to form an oxdiazole ring can be carried out.

(f) Hydrazine is acylated in either order of succession on the one hand with an acid derivative of the kind mentioned under (a) and on the other with an acid derivative of the kind mentioned under (b). If desired, after acylation with the carboxylic acid derivative of the kind mentioned under (b) above, irrespective of whether this is the first or second acylation, the intermediate compound may be coupled with a diazo-compound and there can be obtained, depending on the choice of the starting materials, a symmetrical diacyl-hydrazine such as is also obtainable under (a) above, or an asymmetrical diacyl-hydrazine such as is obtainable under (c) above.

(g) Hydrazine, one or two mono-carboxylic acid derivatives and a dicarboxylic acid derivative are condensed together in a suitable order of succession in the molecular ratio 2:2:1, so that for two molecular proportions of hydrazine and one molecular proportion of a dicarboxylic acid derivative either two molecular proportions of the same monocarboxylic acid derivative or one molecular proportion of each of two different monocarboxylic acid derivatives may be used and at least one acid derivative must be of the constitution mentioned under (a) or (b) above, and if an acid derivative as mentioned under (b) is used coupling with a diazo-compound follows the condensation with that acid derivative.

Thus, for example, two molecular proportions of an ester of a hydroxy-arylcarboxylic acid capable of coupling are condensed with two molecular proportions of hydrazine to form a carboxylic acid hydrazide, the latter is coupled with two molecular proportions of a diazo-compound and the resulting two molecular proportions of carboxylic acid hydrazide containing azo linkages are condensed with one molecular proportion of a dihalide of any desired dicarboxylic acid. The products so obtained, although they contain two hydrazine groups and four acyl groups are referred to herein as diacyl-hydrazines for the sake of simplicity.

As carboxylic acid derivatives of the constitution mentioned under (a) there may be used, for example, derivatives of carboxylic acids of which the carboxylic acid group is bound to a carbon atom of an aromatic ring system, which contains an azo linkage bound directly or through a bridge member to a further ring system or contains a carbon atom capable of coupling. As such carboxylic acid derivatives there may be mentioned, for example, derivatives of monoazo-dyestuff carboxylic acids which can be obtained by coupling a diazotized aminobenzene carboxylic acid with a coupling component free from sulfonic acid and carboxylic acid groups, such as acylacetic acid ester or amide, especially an acetoacetyl-aminobenzene, a pyrazolone, especially a 3-methyl-5-pyrazolone, a phenol, dihydroxyquinoline, and α- or β-naphthol such as 2-hydroxynaphthalene, or 5:8-dichloro-1-hydroxynaphthalene. Advantageous results are also obtained with azo-dyestuffs containing carboxylic acid groups obtained from diazo compounds and carboxylic acids capable of coupling, such as 1-phenyl-3-methyl-5-pyrazolone-3′- or -4′-carboxylic acid, and also acylacetyl-amino-benzene carboxylic acids and cresotinic acid.

Of particular interest, however, are the azo dyestuffs obtained from diazo compounds, especially those suitable for the production of ice colors, and coupling compounds of the formula

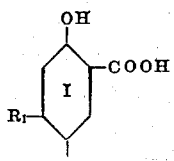

in which $R_1$ represents a cyclic radical fused on to the 6-membered ring I in the manner indicated. As examples of such compounds there may be mentioned 2-hydroxy-diphenyleneoxide-3-carboxylic acid, 2-hydroxy-carbazole-3-carboxylic acid, 2-hydroxyanthracene-3-carboxylic acid and especially 2-hydroxynaphthalene-3-carboxylic acid. In making such azo-dyestuffs it is of advantage to choose diazo-compounds, which are suitable for the production of ice colors, for example those of the benzene series, which may contain in addition to the diazotized amino group other customary substituents, for example, halogen atoms such as chlorine, alkyl or alkoxy groups of low molecular weight, nitro groups or acylamino groups.

As different carboxylic acid derivatives of the constitution mentioned under (a) and (b) to be used according to (e) there may be used derivatives of any desired carboxylic acid. In general it is of advantage to use derivatives of carboxylic acids of not too low molecular weight, advantageously those which contain more than one ring.

Any desired dicarboxylic acid derivatives may be chosen for working according to (g). In some cases it is of advantage to use dichlorides of simple dicarboxylic acids, for example, those of oxalic acid, fumaric acid, isophthalic acid or terephthalic acid, particularly dicarboxylic acids of the formula $HOOC-R_4-COOH$, in which $R_4$ represents a hydrocarbon radical having at the most 6 carbon atoms.

The reaction of the hydrazine with the carboxylic acid derivatives may be carried out by methods in themselves known, advantageously in an organic solvent. Among the carboxylic acids free from azo linkages, for example, 2-hydroxynaphthalene-3-carboxylic acid, it is in general of advantage to use a methyl ester as the functional derivative, and in the case of products containing azo linkages it is of advantage to use carboxylic acid halides. It is known how to prepare such carboxylic acid chlorides, see, for example British Patent No. 730,384 filed February 27, 1952, by Max Schmid et al.

It is generally of advantage so to select the starting material that the diacyl-hydrazines obtainable in the manner described above contain no groups imparting solubility in water, especially no sulfonic acid or carboxylic acid groups.

As agents capable of bringing about ring closure there come into consideration for the present process more especially non-sulfonating agents. Especially good results are usually obtained with thionyl chloride. The ring closure is generally brought about with advantage by heating the diacyl-hydrazine with the ring-closing agent in an inert organic solvent such, for example, as chlorobenzene or nitrobenzene.

The new oxdiazoles of this invention are valuable dyestuffs. Especially valuable are the azo-dyestuffs free from groups imparting solubility in water. These valuable pigments are generally distinguished by their very good fastness to light, good fastness to migration and also by their resistance to heat and fastness to solvents. The latter is especially useful, for example, in so-called pigment printing, that is to say, the printing process in which a pigment is fixed by means of a suitable adhesive such as casein, a hardenable artificial plastic, especially a urea- or melamine-formaldehyde condensation product, a solution or emulsion of polyvinyl chloride or polyvinyl acetate or other emulsion (for example, an oil-in-water emulsion or water-in-oil emulsion) on a substratum, especially on textile fibers, but also on other flat structures, such as paper (for example, wallpaper) or a fabric of glass fibers. The new pigments can also be used for other purposes, for example, in finely divided form for coloring spinning masses used in the manufacture of artificial silk of viscose or cellulose ethers or esters or superpolyamides or superpolyurethanes, and also for producing colored lacquers or lacquer formers, solutions and products of acetyl-cellulose, nitrocellulose, natural resins or artificial resins such as polymerization or condensation resins, for example, aminoplasts, phenoplasts, polyvinyl chloride, polystyrene, polyethylene, polyacryl, rubber, casein, silicone and silicone resins. Furthermore, they can be used with advantage in the manufacture of coloring matters, cosmetic preparations or laminated plates.

The new dyestuffs can easily be dispersed in the normal manner in masses or preparations of the aforesaid kind, and this can be carried out with advantage at a stage in which such masses or preparations have not reached their final form. The operations necessary for forming the products, such as spinning, pressing, hardening, casting, sticking and the like, can then be carried out in the presence of the pigment without interfering with any chemical reaction to which the substratum is to be subjected such as further polymerization, condensation or the like.

The following examples illustrate the invention, the parts and percentages being by weight unless otherwise stated and the relationship of parts by weight to parts by volume being the same as that of the kilogram to the liter:

Example 1

34.0 parts of the azo-dyestuff from diazotized 1-amino-2-methyl-4-chlorobenzene and 2-hydroxynaphthalene-3-carboxylic acid are suspended in 300 parts of chlorobenzene, and the whole is heated at the boil accompanied by the distillation of any water present. As soon as the distillate is clear, the whole is cooled to 70° C., 15 parts of thionyl chloride are added, and the mixture is heated at the boil under reflux until appreciable quantities of hydrogen chloride are no longer evolved. This is the case after 4–5 hours. The mixture is then filtered hot to remove small amounts of impurities and allowed to cool. The dyestuff acid chloride of the formula

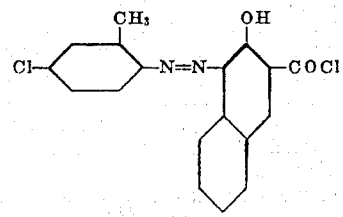

crystallizes on cooling in the form of dark crystals having a bronze lustre. The crystals are filtered off with suction and washed with cold chlorobenzene or benzene and dried in vacuo at 50–60° C.

35.9 parts of the acid chloride so obtained are stirred in 400 parts by volume of anhydrous chlorobenzene with 3.5 parts of hydrazine hydrochloride, and the whole is boiled for 8 hours under reflux. From the initially dark-blue-red solution the hydrazine condensation product separates in the form of an insoluble pale red substance accompanied by the evolution of hydrogen chloride. After 6–8 hours the evolution of hydrogen chloride practically ceases. The mixture is then allowed to cool to 70° C. and 15 parts of thionyl chloride are added. The whole is then boiled for a further 10–12 hours under reflux, during which further large amounts of hydrogen chloride and sulfur dioxide are evolved. When the condensation is finished, the mixture is filtered hot and the filter residue is washed with boiling chlorobenzene until the washings are practically colorless, and the dyestuff so obtained is dried in vacuo at 80–90° C.

The resulting dyestuff of the formula

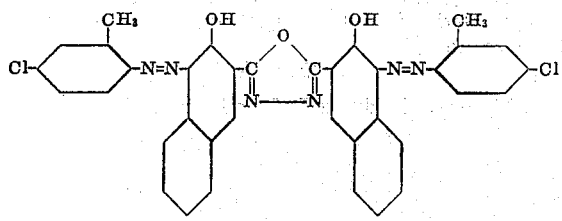

is a pale red powder, which dissolves in concentrated sulfuric acid with a blue-red coloration. It produces in artificial plastics, especially in polyvinyl chloride, powerful through-dyed pure red colorations of good fastness to migration and very good fastness to light.

*Example 2*

35.9 parts of the dyestuff acid chloride of the formula

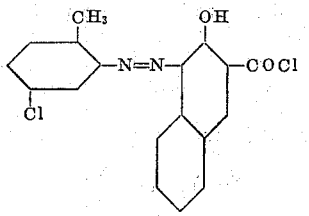

obtainable from the dyestuff carboxylic acid in the manner described in the first paragraph of Example 1 are boiled under reflux for 10 hours in 400 parts by volume of chlorobenzene with 6.1 parts of hydrazine sulfate and 20 parts of pyridine. The whole is cooled to 70° C. and 15 parts of thionyl chloride are added to the suspension of the hydrazine condensation product. The mixture is then heated for a further 12 hours at the boil under reflux. During this period hydrogen chloride and sulfur dioxide gas are evolved. The hot pigment suspension is filtered with suction, and the filter residue is washed with hot chlorobenzene until the washings are colorless. The residue is then thoroughly washed with hot alcohol and dried in vacuo at 60–70° C.

The resulting dyestuff of the formula

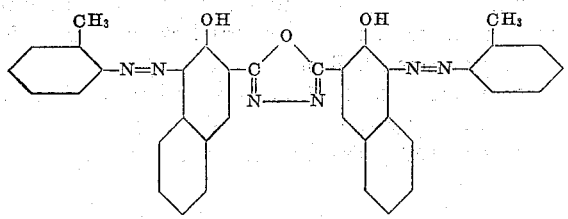

is a red powder which dissolves in concentrated sulfuric acid with a purple red coloration. It can be incorporated well into artificial plastics, for example, polyvinyl chloride foils, and colors these materials bluish red tints of good fastness to migration and very good fastness to light.

*Example 3*

80.4 parts of 2-hydroxynaphthalene-3-carboxylic acid methyl ester (melting at 69.6–70° C.) are heated at the boil in 150 parts of alcohol with 30 parts of hydrazine hydrate. Complete dissolution takes place and after a few minutes the monohydrazide of 2-hydroxynaphthalene-3-carboxylic acid of the formula

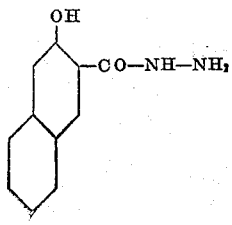

precipitates in the form of handsome, yellowish crystals. The whole is allowed to cool, filtered with suction and the filter residue is washed with cold alcohol. After being dried, the product is obtained in the form of almost colorless lamellae having a fatty lustre and melting at 209–211° C.

40.4 parts of the resulting monohydrazide are dissolved with 30 parts of sodium hydroxide solution of 30 percent strength in 400 parts by volume of water. 60 parts of crystalline sodium acetate are added to the solution, and at 4–6° C. a clear diazo solution prepared from 37.5 parts of 4-chloro-2:5-dimethoxy-1-aminobenzene is run in. In order to complete the coupling the mixture is stirred for 4 hours at 5–10° C., then heated to 40° C., and the dyestuff formed is filtered off and washed well with warm water. After being dried in vacuo at 50–60° C. it is obtained in the form of a dark powder which dissolves in high boiling organic solvents with a violet coloration. It dissolves in concentrated sulfuric acid with a reddish blue coloration.

40 parts of the resulting dyestuff acid hydrazide are stirred with 40.5 parts of the dyestuff acid chloride, obtained by treating the azo dyestuff from diazotized 4-chloro-2:5-dimethoxy-1-aminobenzene and 2-hydroxynaphthalene-3-carboxylic acid with thionyl chloride as described in the first paragraph in Example 1 in 800 parts by volume of anhydrous chlorobenzene with the addition of 10 parts of pyridine, and the whole is heated at the boil for 8 hours under reflux. The mixture is then allowed to cool to 70° C., 30 parts of thionyl chloride are added, and the mixture is heated for a further 12 hours at 120–130° C. The hot suspension is then filtered, the filter residue is washed with boiling chlorobenzene until the washings are practically colorless, and it is then washed thoroughly with hot alcohol and dried in vacuo at 60–70° C. The resulting dyestuff of the formula

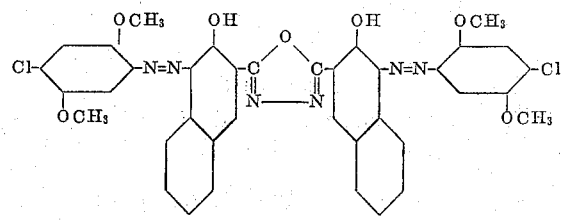

is a violet powder which dissolves in concentrated sulfuric acid with a greenish blue coloration. The dyestuff can be incorporated well in artificial plastics, for example, polyvinyl chloride, and it colors these materials violet tints of good fastness to migration and very good fastness to light.

*Example 4*

38.25 parts of the dyestuff acide chloride of the formula

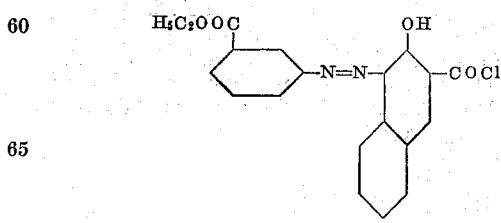

obtained by treating the dyestuff from 1-aminobenzene-2-carboxylic acid ethyl ester and 2-hydroxynaphthalene-3-carboxylic acid with thionyl chloride as described in the first paragraph of Example 1, are stirred with 6.1 parts of hydrazine sulfate and 20 parts of pyridine in 400 parts of nitrobenzene, and the mixture is heated to 130-140° C. The hydrazine condensation product separates in the form of bright red crystals from the dark red solution. The whole is stirred for 6 hours at that temperature, and is then allowed to cool to 70° C. and 30 parts of thionyl chloride are added. The mixture is heated for a further 12 hours at 130-140° C. The crystalline form of the hydrazine condensation product gradually disappears, and a fine bright red suspension is formed. The suspension is filtered hot, and the filter residue is washed with hot nitrobenzene, then with hot benzene and finally with hot alcohol, until the washings are colorless, and the product is dried in vacuo at 60-70° C.

The resulting dyestuff of the formula

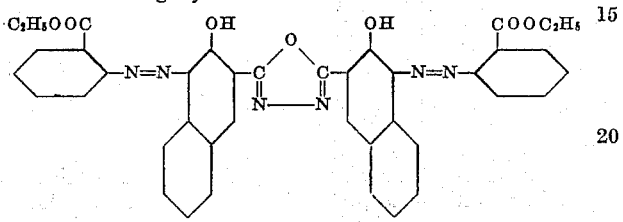

is a bright red powder which dissolves in concentrated sulfuric acid with a red violet coloration. When incorporated by rolling in polyvinyl chloride it produces strong pure red tints of very good fastness to migration and excellent fastness to light.

is a red powder which dissolves in concentrated sulfuric acid with a bordeaux red coloration, and which when incorporated in artificial plastics, especially in polyvinyl chloride, yields strong red tints. The coloration in polyvinyl chloride is fast to migration and has a very good fastness to light.

*Example 6*

32 parts of the dyestuff of the formula

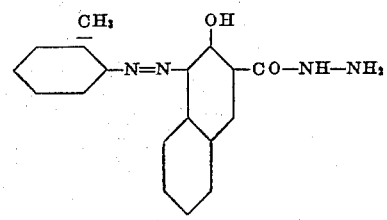

are stirred in 400 parts by volume of chlorobenzene with 5 parts of pyridine and 10.15 parts of terephthalic acid dichloride for 12 hours at 120-130° C. The whole is then allowed to cool to 70° C., 15 parts of thionyl chloride are added, and the mixture is heated for a further 12 hours at 120-130° C. The hot suspension is filtered with suction, and the filter residue is washed with hot chlorobenzene until the washings are colorless. It is then washed with hot alcohol and dried in vacuo at 60-70° C.

The dyestuff of the formula

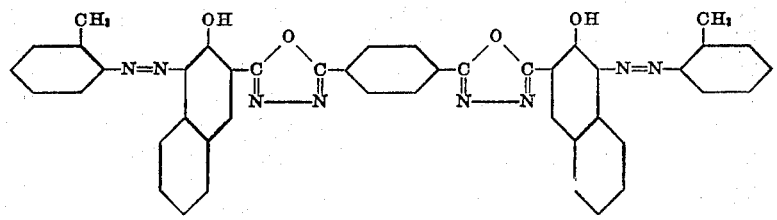

*Example 5*

35.45 parts of the dyestuff of the formula

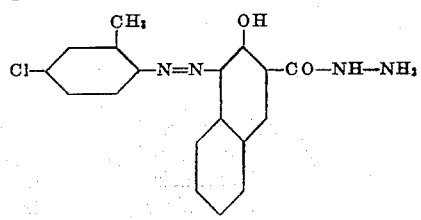

obtained by coupling diazotized 1-amino-2-methyl-4-chlorobenzene with 2-hydroxynaphthalene-3-carboxylic acid hydrazide, are heated in 500 parts by volume of chlorobenzene with 5 parts of pyridine and 7.65 parts of fumaric acid chloride for 8 hours at 120-130° C. The suspension is then allowed to cool to 70° C., 15 parts of thionyl chloride are added, and the whole is heated for a further 12 hours at 120-130° C. The dyestuff formed is then filtered off with suction, washed with hot chlorobenzene until the washings are almost colorless, then washed with hot alcohol and dried in vacuo at 60-70° C.

The resulting dyestuff of the formula is a bright red powder, which dissolves in concentrated sulfuric acid with a red coloration. When incorporated by rolling into polyvinyl chloride the dyestuff yields very pure scarlet red tints of excellent fastness to migration and good fastness to light.

By using, instead of the dyestuff from diazotized 1-amino-2-methylbenzene and 2-hydroxynaphthalene-3-carboxylic acid hydrazide, the dyestuff of the formula

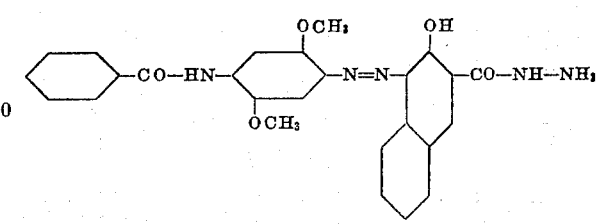

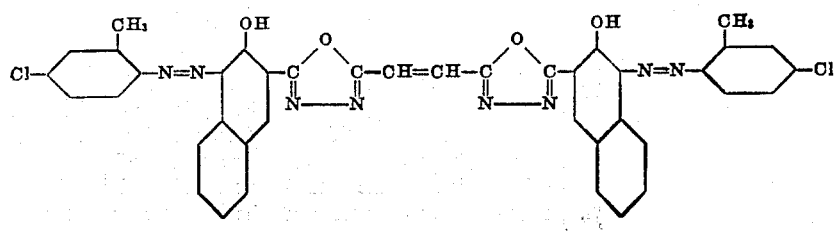

and otherwise proceeding as described in this example, there is obtained the dyestuff of the formula

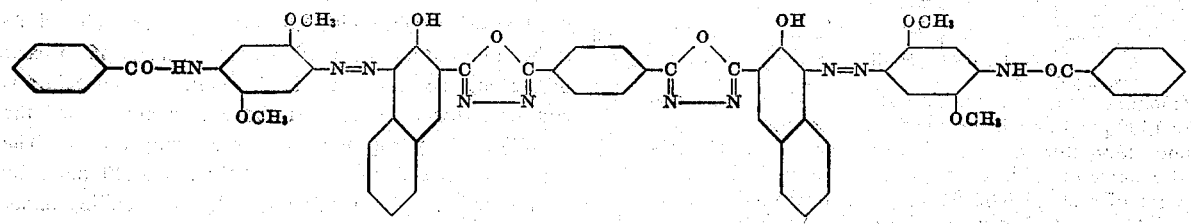

This dyestuff is a dark powder which dissolves in concentrated sulfuric acid with a greenish blue coloration, and when incorporated in artificial plastics, especially those composed of polyvinyl chloride compounds, it yields blue tints which are fast to migration.

Example 7

419.5 parts of the azo-dyestuff from diazotized para-aminobenzoic acid and 4-chloro-2:5-dimethoxy-1-acetoacetylaminobenzene are stirred in 2000 parts of chlorobenzene with 150 parts of thionyl chloride, and the whole is heated in an oil bath at 120° C. The greenish yellow paste becomes thinly liquid and changes into a magma of orange-yellow crystals. The whole is stirred for 4 hours at 120° C. At the end of this period the evolution of hydrogen chloride practically ceases. The whole is then allowed to cool and is filtered with suction. The filter cake is washed with benzene until the washings are colorless.

After drying the product in vacuo there are obtained 415 parts of the dyestuff acid chloride of the formula

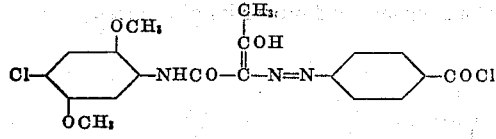

in the form of orange-yellow needles melting at 254–256° C. 43.9 parts of this acid chloride are stirred in 1000 parts of toluene with 5 parts of hydrazine hydrate and heated in the course of one hour to 110° C. 100 parts of toluene are distilled off together with 1.8 parts of water. The water distilled off has an acid reaction to Congo. The reaction mixture consists mainly of the symmetrical dyestuff acid hydrazide and hydrazine hydrochloride. The whole is allowed to cool to 90° C. and a further 43.9 parts of dyestuff acid chloride are added. The whole is then heated at the boil for 6 hours, during which hydrogen chloride is evolved. At the end of this period the condensation is complete, and the mixture is allowed to cool to 80° C. 20 parts by volume of thionyl chloride are then added and the mixture is boiled for 12 hours under reflux. During the first few hours hydrogen chloride and sulfur dioxide are evolved. The mixture is filtered with suction while hot to remove the dyestuff formed, and the latter is washed with hot toluene until the washings are colorless.

After being dried in vacuo the dystuff of the formula

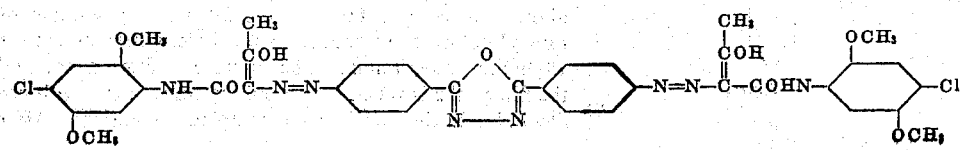

is obtained in the form of a loose yellow powder which dissolves in concentrated sulfuric acid with a reddish yellow coloration. The dyestuff, when incorporated by rolling into polyvinyl chloride, yields pure yellow tints of good fastness to migration and light.

By using, instead of the dyestuff from 4-chloro-2:5-dimethoxy-1-acetoacetylaminobenzene and para-aminobenzoic acid, the dyestuff obtained from the aforesaid coupling component and meta-aminobenzoic acid, 4-chloro-3-aminobenzoic acid or 4-methoxy-3-aminobenzoic acid, there is obtained a dyestuff having similar properties.

Example 8

42.1 parts of the dyestuff acid chloride of the formula

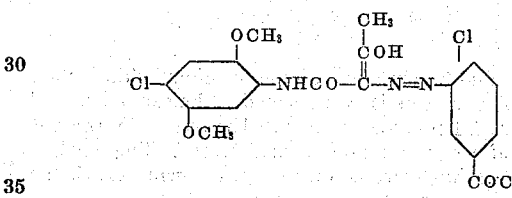

(melting at 253–254° C.) are stirred in 1200 parts of toluene with 5 parts of hydrazine hydrate and the mixture is heated to the boil in one hour. 100 parts of toluene are distilled off, during which 1.8 parts of water distil over. The whole is then allowed to cool to 90° C. and a further 42.1 parts of the acid chloride are added. The whole is then boiled for 6 hours under reflux, during which the orange-yellow chloride rapidly disappears and a greenish yellow suspension is formed. After 6 hours the evolution of hydrogen chloride practically ceases. The mixture is then allowed to cool to 80° C. and 20 parts by volume of thionyl chloride are added. The mixture is again heated to the boil and boiled for 12 hours under reflux. The dyestuff formed is filtered off while hot and the filter residue is washed with boiling toluene until the washings are colorless. After drying the product in vacuo at 60–70° C. there is obtained in very good yield the dyestuff of the formula

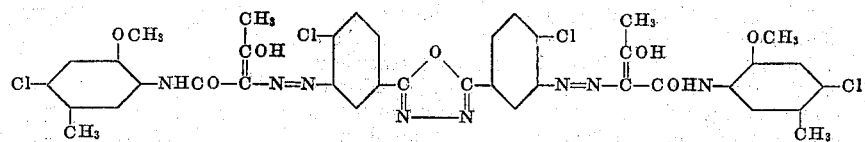

in the form of a loose greenish yellow powder which consists of microscopically small very fine needles. The dyestuff dissolves in concentrated sulfuric acid with a yellow coloration. When incorporated by rolling into polyvinyl chloride it produces pure greenish-yellow tints of excellent fastness to migration and light.

Example 9

42.3 parts of the dyestuff acid chloride of the formula

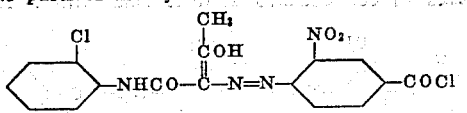

(melting with decomposition at 261–262° C.) are stirred in 1200 parts of toluene and 5 parts of hydrazine hydrate, and the mixture is heated in one hour to 110° C. About 100 parts of toluene are distilled off together with 1.8 parts of water. The whole is then allowed to cool to 90° C. and 42.3 parts of the dyestuff acid chloride are added. The mixture is then boiled for 6 hours under reflux. At the end of this time the evolution of hydrogen chloride practically ceases. The whole is allowed to cool to 80° C. and 20 parts by volume of thionyl chloride are added. The mixture is again heated to the gentle boil and boiled for 12 hours under reflux. The dyestuff formed is filtered off while hot and washed with boiling toluene until the washings are colorless. After being dried, the dyestuff of the formula 46.15 parts of this acid chloride are stirred in 1200 parts of toluene with 5 parts of hydrazine hydrate and heated to the boil in one hour. 100 parts of toluene are distilled off together with 1.8 parts of water. The whole is then allowed to cool to 90° C. and a further 46.15 parts of the acid chloride are added. Boiling under reflux is continued for 6 hours. At the end of this period the evolution of hydrogen chloride practically ceases. The whole is allowed to cool to 80° C. and 20 parts by volume of thionyl chloride are added, and boiling under reflux is continued for a further 12 hours. The dyestuff formed is filtered off while hot, and washed with hot toluene. After being dried, the dyestuff of the formula

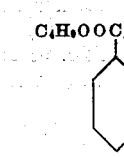

is obtained in the form of a bright yellow powder, which when incorporated in artificial plastics, especially in those composed of polyvinyl chloride, yields very greenish yellow tints having good properties of fastness.

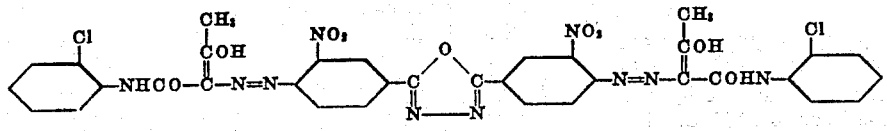

is obtained in good yield in the form of a loose yellow powder which dissolves in concentrated sulfuric acid with a yellow coloration. When incorporated in polyvinyl chloride foils, it yields gold yellow tints which are fast to migration and light.

Example 10

443 parts of the azo-dyestuff from diazotized 1-aminobenzene-2-carboxylic acid butyl ester and 4-methoxy-3-acetoacetylamino-benzoic acid are stirred in 2500 parts of benzene with 150 parts of thionyl chloride and the mixture is slowly heated to the boil. At 80° C. the dyestuff dissolves. Stirring is continued for a further hour at that temperature and then the mixture is allowed to cool, whereupon the acid chloride crystallizes out in the form of small pale yellow needles. The crystals are filtered off with suction, washed with a small amount of cold benzene and petroleum ether, and dried in vacuo at 60–70° C. There are obtained 385 parts of the dyestuff acid chloride of the formula

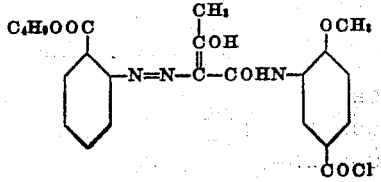

melting at 168–169° C.

Example 11

39.95 parts of the dyestuff acid chloride of the formula

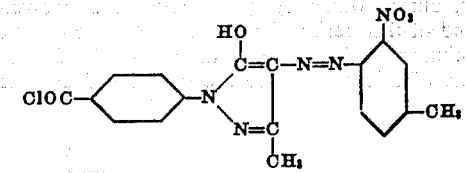

(melting at 263–265° C.) are stirred in 1200 parts of toluene with 5 parts of hydrazine hydrate, and the whole is heated to the boil in one hour. About 100 parts of toluene are distilled off together with 1.8 parts of water. The whole is then allowed to cool to 90° C. and a further 39.95 parts of the dyestuff acid chloride are added. The mixture is then boiled for 6 hours under reflux, during which a strong evolution of hydrogen chloride is observed at the outset. At the end of this period the mixture is allowed to cool to 80° C., and 20 parts by volume of thionyl chloride are added. The whole is then boiled for 19 hours under reflux. The mixture is filtered hot and the filter cake is washed with boiling toluene and with hot alcohol until the washings are completely colorless. After being dried in vacuo at 60–70° C., the dyestuff of the formula

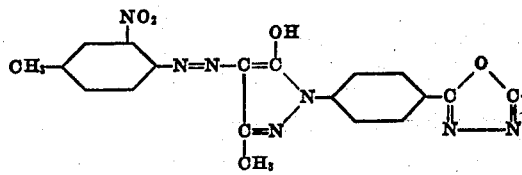

a loose yellow-orange powder which dissolves in concentrated sulfuric acid with a yellow coloration and when incorporated in artificial plastics, especially in polyvinyl chloride yields powerful orange tints which are fast to light.

Example 12

42.0 parts of the dyestuff acid chloride of the formula

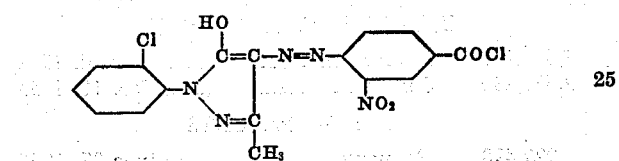

which melts at 180.5–182° C. are stirred in 1200 parts of toluene with 5 parts of hydrazine hydrate and the whole is heated to the boil in one hour. 100 parts of toluene are distilled off together with 1.8 parts of water. The whole is then allowed to cool to 90° C. and a further 42.0 parts of the dyestuff acid chloride are added. The mixture is then boiled for 6 hours under reflux, allowed to cool to 80° C., and 20 parts by volume of thionyl chloride are added. The whole is then boiled under reflux for 12–15 hours, and the dyestuff formed is filtered off while hot, and washed with hot toluene and hot alcohol until the washings are colorless. After drying the product in vacuo, there is obtained in very good yield the dyestuff of the formula

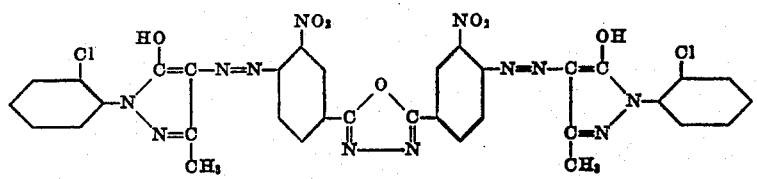

in the form of a loose, yellow-orange powder which dissolves in concentrated sulfuric acid with a yellow coloration. When incorporated into artificial plastics, especially in polyvinyl chloride, it yields clear reddish yellow tints which are fast to migration and light.

Example 13

65 parts of polyvinyl chloride, 35 parts of dioctylphthalate and 0.5 part of the disazo dyestuff obtainable as described in Example 1 are stirred together, and the resulting mixture is then passed to and fro between the two rollers of a calender for about 3 minutes at 140–145° C. There is obtained a pure red colored foil which is strongly colored and has a very good fastness to light and migration.

What is claimed is:
1. An azo pigment which is free from water-solubilizing groups and corresponds to the formula

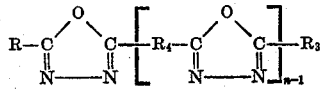

in which $n$ represents a whole number of at the most 2, $R_4$ represents a hydrocarbon radical having at least 2 and at the most 6 carbon atoms, and R and $R_3$ each represents a member selected from the group consisting of radicals corresponding to the formulae

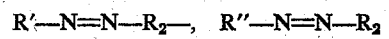

and

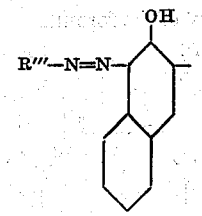

in which R′ is an acetoacetylaminobenzene radical, each of $R_2$ and R‴ is an aromatic radical containing a single ring which is a six-membered carbocyclic ring, and R″ is a pyrazolone radical.

2. An azo pigment which is free from water-solubilizing groups and corresponds to the formula

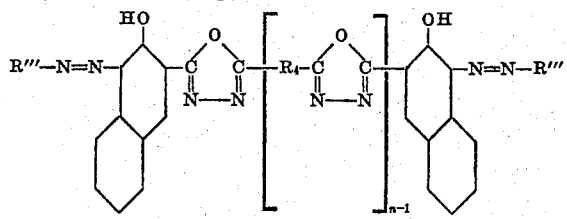

in which $n$ represents a whole number of at the most 2, R‴ represents an aromatic radical containing a single ring which is a six-membered carbocyclic ring, and $R_4$ represents a hydrocarbon radical having at least 2 and at the most 6 carbon atoms.

3. An azo pigment which is free from water-solubilizing groups and corresponds to the formula

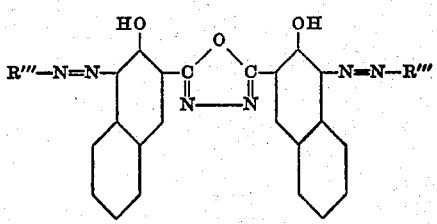

in which R‴ represents an aromatic radical containing a single six-membered ring which is a carbocyclic ring.

4. The azo pigment of the formula
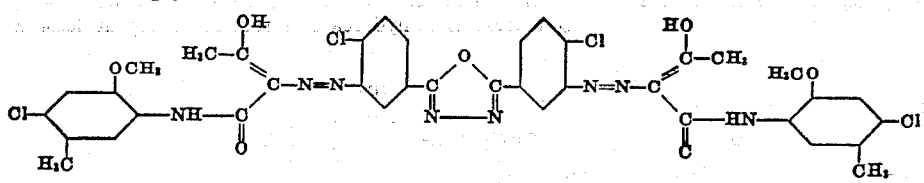
5. The azo pigment of the formula
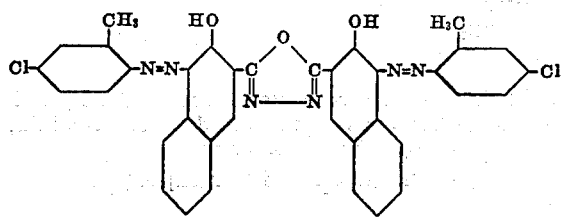
6. The azo pigment of the formula
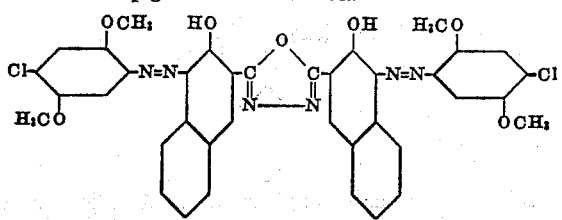
7. The azo pigment of the formula
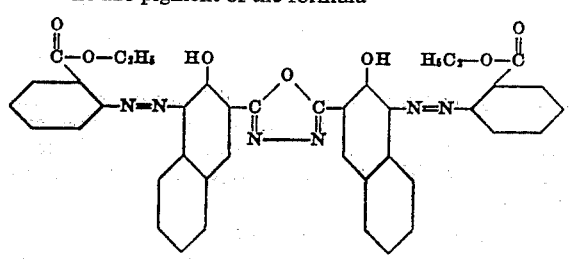
References Cited in the file of this patent
UNITED STATES PATENTS
| | | |
|---|---|---|
| 2,616,891 | Schwechten et al. | Nov. 4, 1952 |
| 2,628,230 | Stilmar | Feb. 10, 1953 |
FOREIGN PATENTS
| | | |
|---|---|---|
| 929,498 | Germany | June 27, 1955 |